United States Patent

Obama

[11] Patent Number: 4,480,495
[45] Date of Patent: Nov. 6, 1984

[54] JOINT DEVICE

[75] Inventor: Masao Obama, Yokosuka, Japan

[73] Assignee: Tokyo Shibaura Denki Kabushiki Kaisha, Kawasaki, Japan

[21] Appl. No.: 418,208

[22] Filed: Sep. 15, 1982

[30] Foreign Application Priority Data

Sep. 21, 1981 [JP] Japan .................. 56-147956

[51] Int. Cl.³ ............................................. F16H 37/06
[52] U.S. Cl. ................................. 74/479; 74/665 C; 403/54; 403/74; 901/28
[58] Field of Search ................ 414/735, 1, 4, 7; 901/23-29, 14, 15; 3/12, 12.2, 12.3, 12.4, 12.5, 17 R, 22, 30; 74/479, 665 R; 403/54, 74; 464/106

[56] References Cited

U.S. PATENT DOCUMENTS

| | | | |
|---|---|---|---|
| 3,261,223 | 7/1966 | Vertut | 901/26 X |
| 4,107,948 | 8/1978 | Molaug | 901/27 X |
| 4,353,677 | 10/1982 | Susnjara | 901/29 X |
| 4,392,140 | 7/1983 | Bastian | 74/479 X |

FOREIGN PATENT DOCUMENTS 47-15861 8/1972 Japan .
50-32656 3/1975 Japan .

OTHER PUBLICATIONS

Robot Engineering, S. Goda et al, 1977, Corona-sha.

Primary Examiner—Robert J. Spar
Assistant Examiner—Donald W. Underwood
Attorney, Agent, or Firm—Oblon, Fisher, Spivak, McClelland & Maier

[57] ABSTRACT

A joint device has each of its arms jointed at joint sections arranged at front and back ends thereof. The arms are allowed at the joint section to move relatively in two directions perpendicular to each other. Semi-circular guide members are rotatably attached to support member of each of arm by pins at each of the joint sections. The guide members of adjacent arms are fixed with their rotation axes directed substantially perpendicular to each other. A driving structure for driving one of these guide members around the rotation axis of the other is arranged to the support member of an arm adjacent to the arm to which the guide member is attached. When the guide member is driven by means of the driving structure, the support member on which the driving structure is arranged is rotated relative to the guide member. As the result, the whole of the arm is rotated. Since the guide members are fixed substantially perpendicular to each other in each of the joint sections, the adjacent arms are allowed to freely move taking as their rotating axes two directions perpendicular to each other. The rotating position of each arm is detected by potentiometers. Limit switches are arranged to prevent the adjacent arms from being rotated relative to each other over a maximum swinging angle. A plurality of the arms are jointed with one another at their joint sections to enhance freedom of movement at the foremost end of the joint device.

12 Claims, 11 Drawing Figures

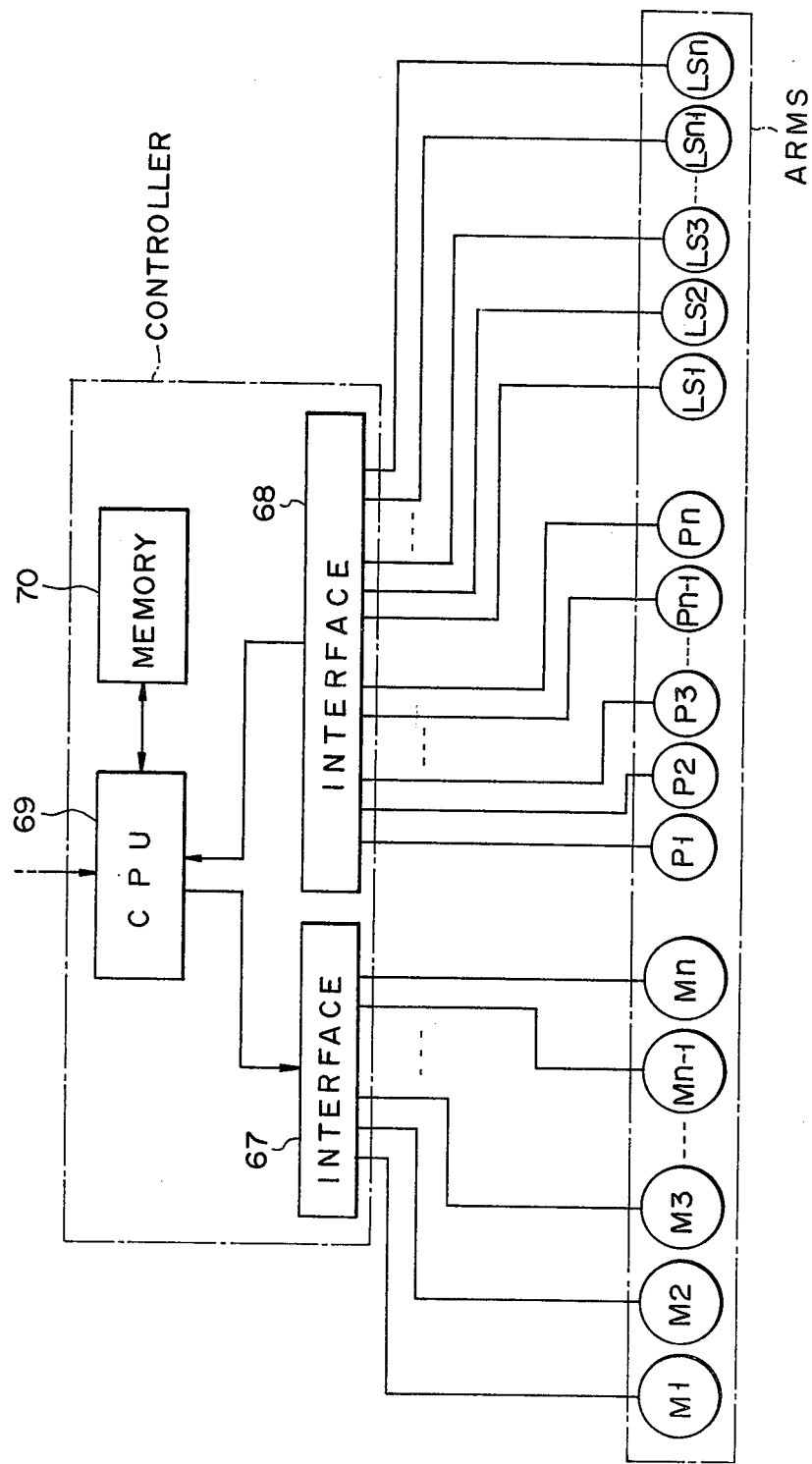

JOINT DEVICE

BACKGROUND OF THE INVENTION

The present invention relates to a joint device suitable for use as legs or arms of an industrial robot.

Facilities such as tower tank, nuclear reactor, fusion reactor and shielding cell in a nuclear fuel reprocessing plant have neither entrance nor space large enough to allow technical personnel to enter or work in and contain harmful radioactive rays and the like. Therefore, it is usually impossible for personnel to enter directly inside these facilities to check them or work in them. With these facilities, it is necessary that the working person be located at a safe site and remotely operate an industrial robot arranged in these facilities or be allowed into them through a small entrance to check or work in them.

This industrial robot must be provided with joints with high freedom in movement for directing a inspection television camera, or the like, attached to the ends of the robot's legs or arms. The TV camera must be able to be moved in any direction or to be set in any position in a small space. Conventional robots employ a combination of rotation joints and pivot joints. Conventional joint devices which allowed rotation, up-down and right-left rocking movements to be achieved through one joint employed a plurality of bevel gears and shafts and therefore became complicated in structure and large in size.

SUMMARY OF THE INVENTION

An object of the present invention is to provide a joint device simple in structure and small in size.

Another object of the present invention is to provide a joint device enabling up-down and right-left rocking movements to be achieved through one joint section and allowing free movement to be attained within a predetermined solid angle.

A further object of the present invention is to provide a joint device of a multi-joint arm type in which a plurality of joint sections are connected with one another to make movement more free enabling the back side of an obstacle to be seen.

According to the present invention a joint device is provided comprising a first elongated support member, a first rotating means attached to one end of said first elongated support member in the longitudinal direction thereof, a first plate-like guide member rotatably attached to one end of said first support member through said first rotating means and taking as its rotation axis a direction normal to the longitudinal direction of said first support member and parallel to a face of said first guide member, a second elongated support member, a second rotating means attached to one end of said second support member in the longitudinal direction thereof, a second plate-like guide member attached rotatably to one end of said second support member through said second rotating means, taking as its rotation axis a direction normal to the longitudinal direction of said second support member and parallel to a face of said second guide member, and also fixed to the first guide member with its rotation axis directed substantially perpendicular to the rotation axis of said first guide member, a first driving means arranged at the second support member to drive the first guide member around the rotation axis of said second guide member, and a second driving means arranged at the first support member to drive the second guide member around the rotation axis of said first guide member.

BRIEF DESCRIPTION OF THE DRAWINGS

FIG. 6 is a block diagram showing an embodiment of a controller employed in the joint device of multi-joint arm type;

DETAILED DESCRIPTION OF THE PREFERRED EMBODIMENTS

Figure 1:
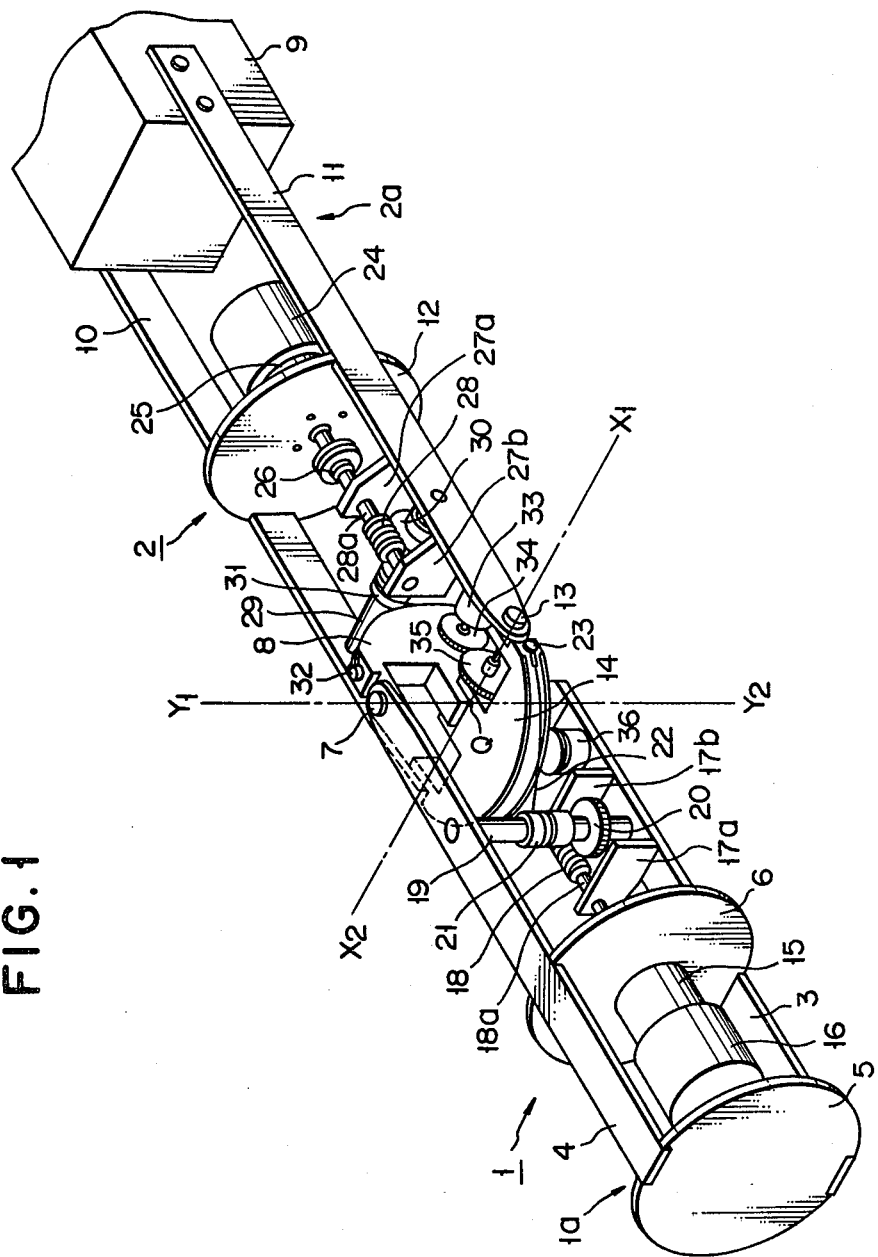
FIG. 1 is a perspective view showing an embodiment of a joint device according to the present invention.

FIG. 1 shows a joint device applied to an industrial robot or the like. This joint device comprises a second arm 2 fixed to a base 9 and a first arm 1 connected vertically and horizontally rockable to the second arm 2. A first support member 1a in the arm 1 includes two support discs 5 and 6, and two elongated support plates 3 and 4 fixed to the upper and lower portions of the circumferences of said support discs 5 and 6 and arranged substantially parallel to each other. Pins 7 serving as first rotating means are rotatably attached to the other ends of said elongated support plates 3 and 4 which are opposite to their ends and fixed to the support discs 5 and 6 (only the pin 7 attached to the elongated support plate 4 is shown in FIG. 1). A semi-circular guide member 8 having a groove formed in its circumferential end face is fixed to the pins 7 at both its portions of the guide member 8 apart in the circumferential direction thereof. The guide member 8 is therefore rotatable relative to the elongated support plates 3 and 4, taking as its rotation axis a line (or axis $Y_1$-$Y_2$ in FIG. 1) combining the pin 7 attached to the elongated support plate 3 with the other pin 7 attached to the elongated support plate 4. Said line (or axis $Y_1$-$Y_2$) is normal to the longitudinal direction of support member 1a and parallel to the face of guide member 8.

A second support member in the second arm 2 includes a support disc 12 and two elongated support plates 10 and 11 fixed substantially parallel to each other to the circumference of said support disc 12. The elongated support plates 10 and 11 are fixed horizontally opposite to each other to the base 9 secured to the body of a robot or arranged in the tower tank. Pins 13 serving as second rotating means are rotatably attached to the other ends of said elongated support plates 10 and 11 which are opposite to their ends fixed to the base 9 (only the pin 13 attached to the elongated support plate 11 is shown in FIG. 1). A semi-circular guide member 14 same in shape as the guide member 8 is fixed to the pins 13 at both its portions of the guide member 14 apart in the circumferential direction thereof. The guide member 14 is therefore rotatable relative to the elongated support plates 10 and 11, with as its rotation axis a line (or axis $X_1-X_2$ in FIG. 1) combining the pin 13 attached to the elongated support plate 10 with the pin 13 attached to the other elongated support plate 11. Said line (or axis $X_1-X_2$) is normal to the longitudinal direction of support member 2a and parallel to the face of guide member 14. The guide members 8 and 14 are fixed in such a way that their rotation axes (or axes $Y_1-Y_2$ and $X_1-X_2$) cross each other in the center of their pin-connected points. Therefore, the arm 1 can be rocked in vertical and horizontal directions relative to the arm 2 through the guide members 8 and 14 fixed to each other with their rotation axes crossed while the arm 2 is fixed to the base 9 with its whole shape kept horizontal, so that the end of said arm 2 can be rotated by combination of vertical and horizontal rocking movements.

A reduction gear 15 is fixed to the support disc 6 of the first arm 1 and a motor 16 is connected to the reduction gear 15. A shaft 18a having a worm 18 fixed coaxially thereto is rotatably supported by support plates 17a and 17b erected on the elongated support plate 3. A shaft (not shown) driven by the motor 16 through the reduction gear 15 is projected toward the shaft 18a through a bearing (not shown) attached to the support disc 6 and connected to the shaft 18a through a joint (not shown but see joint 26). A shaft 19 is bridged between the elongated support plates 3 and 4 and the ends of said shaft 19 in the longitudinal direction thereof are rotatably supported by the elongated support plates 3 and 4. The shaft 19 has a worm wheel 20 fixed coaxially thereto and engaged with the worm 18. The shaft 19 also has a wire drum 21 fixed coaxially thereto above the worm wheel 20. When the worm wheel 20 is rotated by the rotation of said worm 18, the wire drum 21 is also rotated. A part of a wire 22 is wound around the wire drum 21. One end of said wire 22 is fixed to a pin 23 which is fixed to a portion of said guide member 14 near the pin 13 located on the side $X_1$, while the other end of said wire 22 is fixed to a pin (not shown) which is fixed to the other portion of said guide member 14 near the pin 13 located on the side $X_2$. When the wire drum 21 is rotated, the wire 22 draws the wire drum 21 to the end of said guide member 14 located on the side $X_1$ or $X_2$, keeping a part of said wire 22 fitted in a circumferential groove of said guide member 14.

A reduction gear 25 is fixed to the support disc 12 of said second arm 2 and a motor 24 is connected to the reduction gear 25. A shaft 28a having a worm 28 fixed coaxially thereto is rotatably supported by support plates 27a and 27b erected on the elongated support plate 11. A shaft driven by the motor 24 through the reduction gear 25 is projected toward the shaft 28a through a bearing (not shown) attached to the support disc 12 and connected to the shaft 28a through a joint 26. A shaft 29 is rotatably supported between the elongated support plates 10 and 11. The shaft 29 has a worm wheel 30 and a wire drum 31 fixed coaxially thereto. The worm wheel 30 is engaged with the worm 28. Partly wound around the wire drum 31, one end of a wire is fixed to a pin 32 which is fixed to a portion of said guide member 8 near the pin 7 located on the side $Y_1$, while the other end of said wire is fixed to a pin (not shown) which is fixed to the other portion of said guide member 8 near the pin 7 located on the side $Y_2$. When the wire drum 31 is rotated, therefore, the wire draws the wire drum 31 to the end of said guide member 8 located on the side $Y_1$ or $Y_2$, keeping a part of said wire fitted in a circumferential groove of said guide member 8.

A potentiometer 33 is arranged on the elongated support plate 11 and a spur wheel 34 is coaxially fixed to the shaft of said potentiometer 33. The pin 13 has a spur wheel 35 fixed coaxially thereto and engaged with the spur wheel 34. When the guide member 14, that is, the first arm 1 rotates around the axis $X_1-X_2$, the spur wheel 35 is rotated along with the spur wheel 34 engaged therewith, so that the rotating angle (or rotating position) of said arm 1 can be detected by the potentiometer 33. Another potentiometer 36 is similarly arranged on the elongated support plate 3 to detect the rotating angle of said elongated support plate 3 relative to the guide member 8, that is, the rotating angle (or rotating position) of said arm 1 rotated horizontally around the axis $Y_1-Y_2$.

When the motor 16 is rotated, its rotation is reduced by the reduction gear 15 to raise its rotation moment and then transmitted to the worm 18. The worm wheel 20 and then the wire drum 21 are rotated due to the rotation of said worm 18, winding while unwinding the wire 22. Since both ends of said wire 22 are fixed to the guide member 14 by pins 23, the shaft 19 is drawn by the wire 22 to one of the ends of said guide member 14 in the circumferential direction thereof. As a result, the elongated support plates 3 and 4, that is, the whole of said first arm 1 is horizontally rotated around the axis $Y_1-Y_2$, and this horizontally-rotating position of said arm 1 is detected by the potentiometer 36.

When the motor 24 rotates, on the other hand, its rotation is transmitted to the wire drum 31 via the reduction gear 25, joint 26, worm 28 and worm wheel 30. Thanks to the rotation of said wire drum 31, the guide member 8 is vertically rotated around the axis $X_1-X_2$ by the wire. Since the second arm 2 is fixed to the base 9, the whole of said first arm 1 is vertically rotated due to the rotation of said motor 24, taking the axis $X_1-X_2$ as its rotation axis. The vertically-rotating position of said arm 1 can be detected by the potentiometer 33.

The first arm 1 rotates taking the axis $X_1-X_2$ or $Y_1-Y_2$ as its rotation axis, as described above. Therefore, the arm 1 can rock in horizontal and vertical directions, thus achieving double the free movement. When these two-way movements are caused at the same time, the arm 1 can whirl with the joint section as its center. Namely, the arm 1 can move freely taking as its center a point Q where the axes $X_1-X_2$ and $Y_1-Y_2$ cross each other. The rotating position of said arm 1 can be detected by the potentiometers 33 and 36. Even when the arm 1 is rotated by any causes, the worm wheel 20 or 30 does not rotate the worm 18 or 28. Therefore, the shaft of said motor 16 or 24 is not rotated by the unnecessary rotation of said arm 1.

Figure 2:
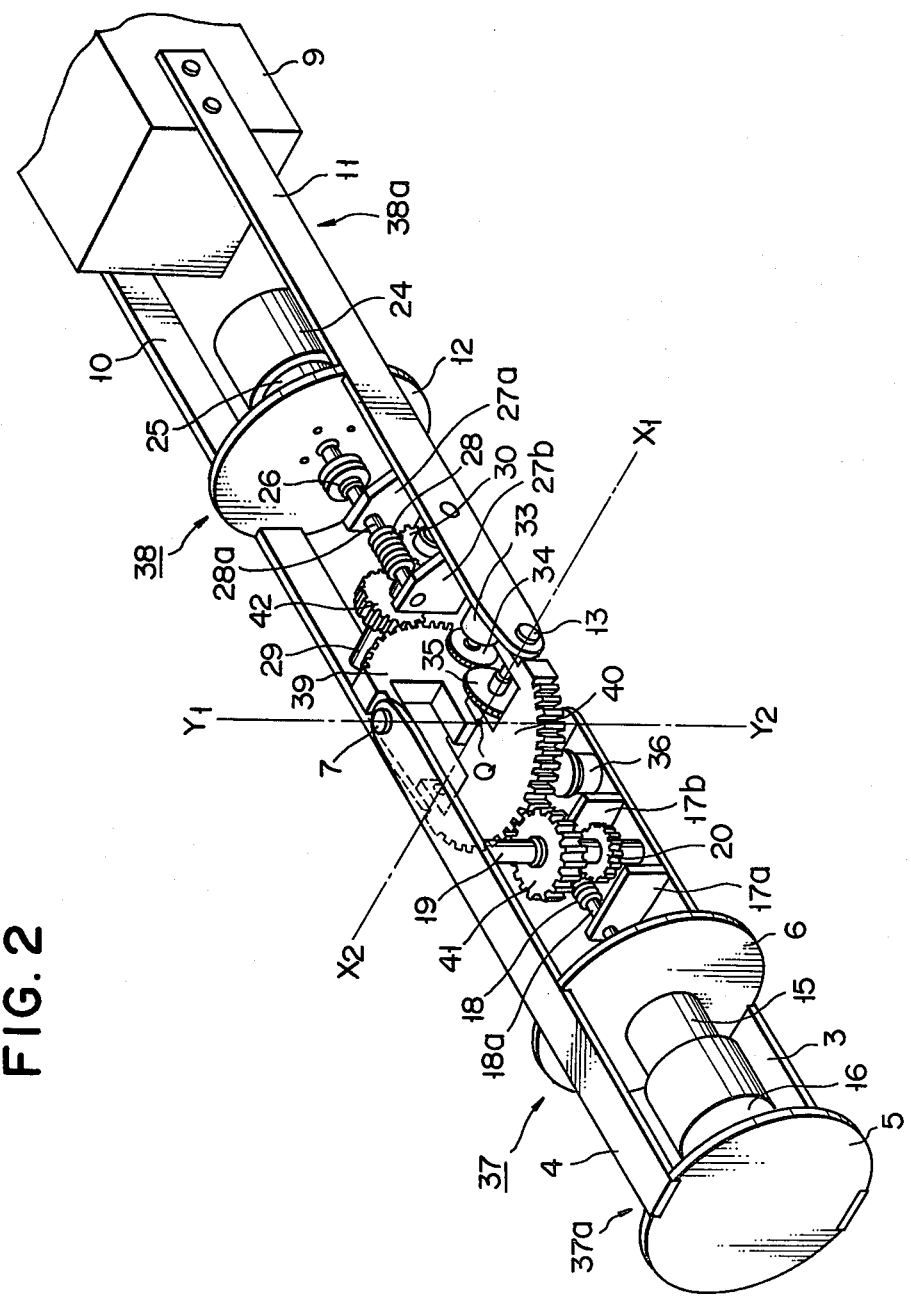
FIG. 2 is a perspective view showing another embodiment of a joint device according to the present invention.

FIG. 2 is a perspective view showing another embodiment of the present invention, in which parts of this embodiment which correspond to those of the already-described embodiment will be represented by the same numerals, and description on these parts will be omitted. This second embodiment is not intended to achieve the relative rotation between the guide members and the elongated support members by the wires, as seen in the embodiment shown in FIG. 1, but to transmit the rotation of motors through gear wheels. Guide members 39 and 40 in arms 37 and 38 are of semi-circular shape and have teeth on their circumferential end faces. Namely, each of said guide members 39 and 40 has a form like a symmetrically-divided spur wheel. The guide members 39 and 40 are fixed and cross each other in the center of curvature. The guide member 39 is rotatably attached to the elongated support plates 3 and 4 of support member 37a by pins 7 at both its portions of the guide member 39 apart in the circumferential direction thereof. The guide member 40 is also rotatably attached to the elongated support plates 10 and 11 of support member 38a by pins 13 at both its portions of the guide member 40 apart in the circumferential direction thereof. Instead of the wire drum 21, the shaft 19 has a spur wheel 41 fixed coaxially thereto and engaged with the guide member 40. Instead of the wire drum 31, the shaft 29 has a spur wheel 42 fixed coaxially thereto and engaged with the guide member 39.

With this embodiment, the rotation of the motor 16 is transmitted through the worm 18 and worm wheel 20 to the spur wheel 41. When the spur wheel 41 engaged with the guide member 40 is rotated, the arm 37 is horizontally rotated around the axis $Y_1-Y_2$. On the other hand, the rotation of the motor 24 is transmitted through the worm 28 and worm wheel 30 to the spur wheel 42. Thanks to the rotation of said spur wheel 42, the guide member 39 engaged with the spur wheel 42 is rotated around the axis $X_1-X_2$ while the arm 37 is vertically rotated around the axis $X_1-X_2$.

This embodiment also enables the arm 37 to freely move taking as its center the point Q where the axes $X_1-X_2$ and $Y-Y_2$ cross each other. This embodiment is intended to transmit the rotation of said motor 16 or 24 to the guide member 40 or 39 through the spur wheel 41 or 42 engaged with the guide member 40 or 39, so that the arm 37 can be reliably moved.

Figure 3:
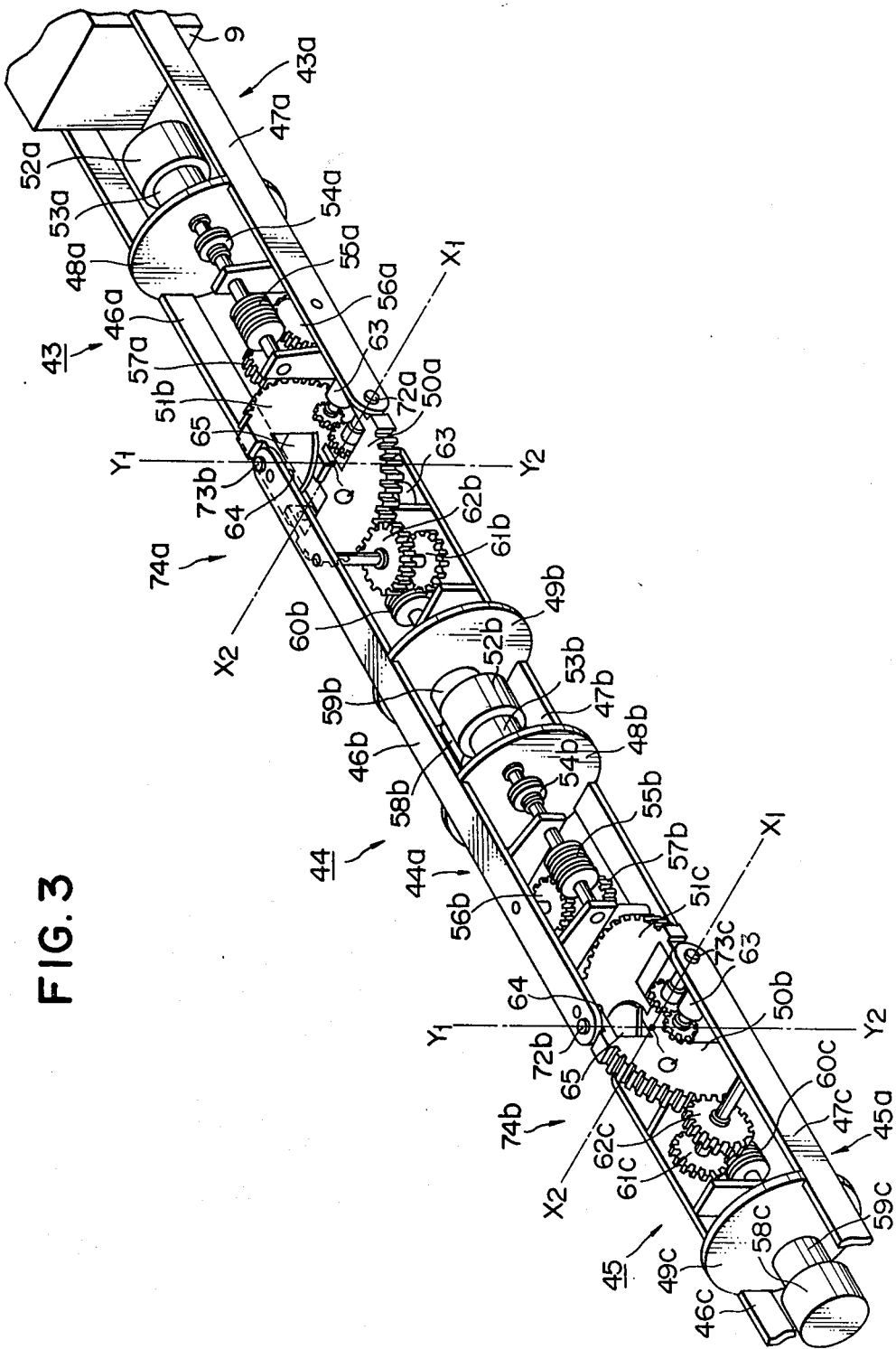
FIG. 3 is a perspective view showing an embodiment of a joint device of a multi-joint arm type according to the present invention.

A further embodiment of the present invention will be described referring to FIG. 3. This is related to a joint device of multi-joint arm type in which a plurality of arms 43, 44 and 45 are connected by joint sections 74a, 74b each being arranged at one end of each of said arms. The construction of each arm and each joint section is the same as shown in FIG. 2. The support member 43a of the arm 43 consisting of an elongated support plate 46a, 47a and a support disc 48a is arranged on the base 9. A guide member 50a similar to the guide member 40 and having a form like a symmetrically-divided spur wheel is rotatably attached to the foremost end of said elongated support plates 46a and 47a by pins 72a. In the case of the arm 44, the support member 44a includes two support discs 48b and 49b and two elongated support plates 46b and 47b fixed to the support discs 48b and 49b at the center thereof. A guide member 51b similar to the guide member 39 and having a form like a symmetrically-divided spur wheel is rotatably attached to the back ends of said elongated support plates 46b and 47b by pins 73b. A guide member 50b is rotatably attached to the front ends of said elongated support plates 46b and 47b by pins 72b. The arm 45 has the same construction as the arm 44 but the arm 44 turns by 90 degrees around the longitudinal axis thereof. Namely, the elongated support plates 46b and 47b are arranged opposite to each other in the vertical direction in the arm 44 while elongated support plates 46c and 47c are arranged opposite to each other in the horizontal direction in the arm 45. The elongated support plates 46c and 47c of the support member 45a are fixed to two support discs (only a support disc 49c is shown in FIG. 3), and a guide member 51c is freely and rotatably attached to the back ends of said elongated support plates 46c and 47c by pins 73c. The guide members 50a and 51b or 50b and 51c in each of said joint sections are fixed in such a way that their rotation axes cross each other. Therefore, the arms 43 and 44 or 44 and 45 can move relative to each other in each of said joint sections, taking the axes $X_1-X_2$ and $Y_1-Y_2$ as their rotation axes.

Figure 4B:
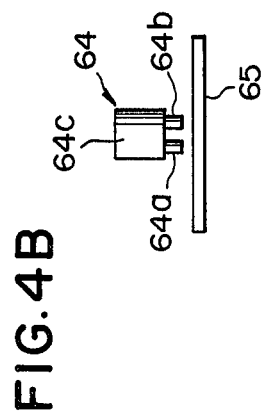
FIGS. 4A, 4B and 4C are schematic diagrams showing an embodiment of detecting means for detecting maximum swinging angle through a limit switch.
Figure 4A:
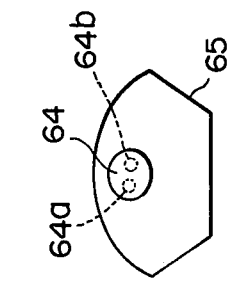
Figure 4C:
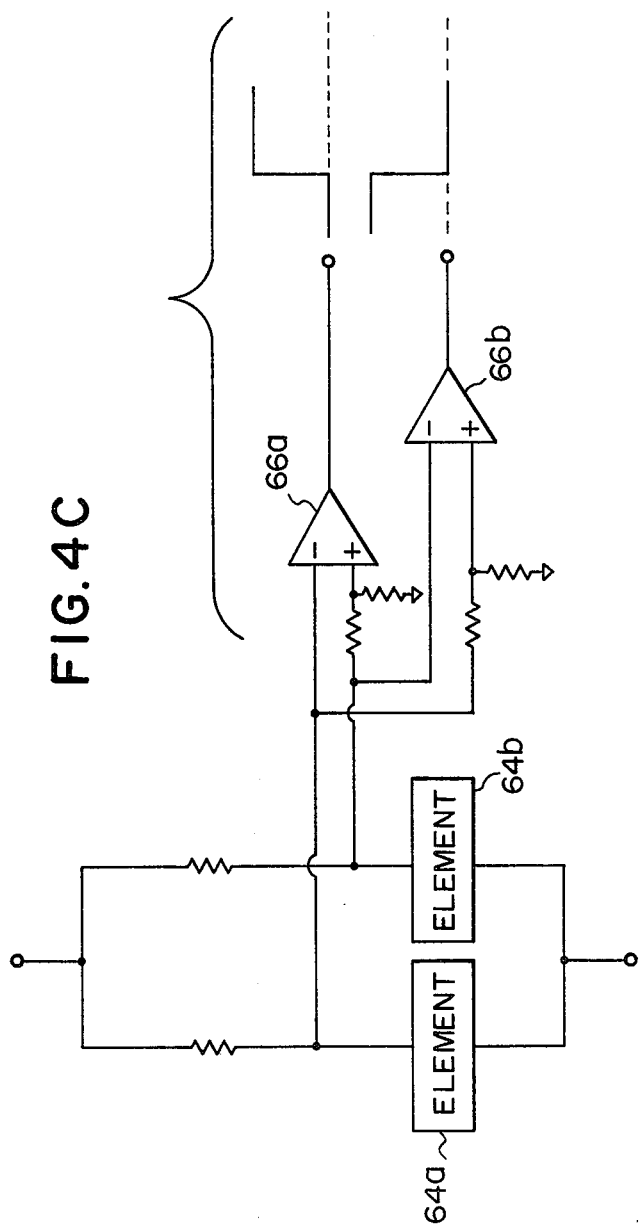

A driving means for driving the guide member 51b and consisting of a motor 52a, a reduction gear 53a, a joint 54a, a worm 55a, a worm wheel 56a and a spur wheel 57a is arranged on the support member 43a in the arm 43 so as to transmit the rotation of said motor 52a to the guide member 51b. Similarly, a driving means for driving the guide member 50a and consisting of a motor 58b, a reduction gear 59b, a joint (not shown), a worm 60b, a worm wheel 61b and a spur wheel 62b, and another driving means for driving the guide member 51c and consisting of a motor 52b, a reduction gear 53b, a joint 54b, a worm 55b, a worm wheel 56b and a spur wheel 57b are arranged on the support member 44a in the arm 44. A driving means for driving the guide member 50b and consisting of a motor 58c, a reduction gear 59c, a joint (not shown), a worm 60c, a worm wheel 61c and a spur wheel 62c is also arranged on the support member 45a in the arm 45. Due to the rotation of said motors 52a and 58b, therefore, the arm 44 can move in any direction relative to the arm 43 fixed to the base 9. Due to the rotation of said motors 52b and 58c, the arm 45 can also move in any direction relative to the arm 44. The rotating angle (or rotating position) of the arm in each of joint sections can be detected by potentiometers 63. In each of the joint sections there is arranged a limit switch to stop the rotation of motors when the relative rotating angle between the arms reaches a limit value (or maximum rocking angle). This limit switch has a sensor 64 attached to the underside of said elongated support plate 46b, for example, with its detecting direction directed vertically downward, and a fan-like indication plate 65 fixed horizontal to the side of said guide member 50b or 51b. As shown in FIG. 4A and FIG. 4B, the sensor 64 includes a magnet 64c and magnetic reluctance elements 64a and 64b juxtaposed to the underside of said magnet 64c. The sensor 64 is intended to detect changes in magnetic field of said magnet 64c as changes in magnetic reluctance through the magnetic reluctance elements 64a and 64b. The indication plate 65 is a magnetic plate made of iron or the like. When the indication plate 65 is in a magnetic field excited by the magnet 64c, the strength of the magnetic field detected through the magnetic reluctance elements 64a and 64b is high. When the indication plate 65 escapes from right above the magnetic reluctance element 64a or 64b, however, the strength of the magnetic field detected by one of said magnetic reluctance elements 64a and 64b becomes low, thus making the magnetic reluctance value of said element different from that of the other element. As shown in FIG. 4C, comparators 66a and 66b detect a difference in voltage drop generated due to the reluctance value change between said magnetic reluctance elements 64a and 64b. The limit position of maximum rocking angle is detected as output signals of said comparators 66a and 66b. Two units of such limit switches as described above are arranged in each of the joint sections to detect the limit position of arm rotation around the axes $X_1-X_2$ and $Y_1-Y_2$.

In this embodiment each of arms 44, 45 includes two motors 52b and 58b, for example. These two motors 52b and 58b are juxtaposed with each other in a direction perpendicular to the longitudinal direction of said arm 44. The length of said arm 44 can thus be shortened. The shafts of said reduction gears 53b and 59b connected to the motors 52b and 58b respectively are attached eccentrically to the support discs 48b and 49b. The elongated support plates 46b, 47b and support discs 48b, 49b can be made integral to one another, thus allowing the rigidity of each of said arms to be enhance.

Figure 5:
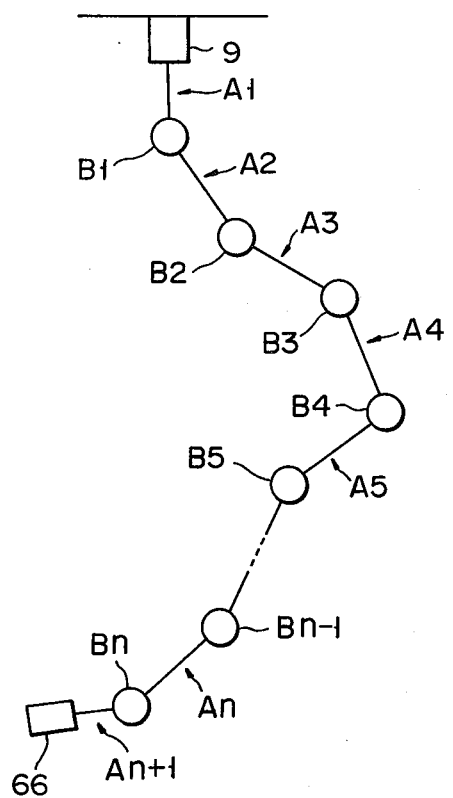
FIG. 5 is a schematic diagram showing an embodiment of checking means in which the joint device of multi-joint arm type is employed.

FIG. 5 is a schematic view showing a movement of said joint device of a multi-joint arm type. Arms A1, A2, A3, A4, A5, . . . , An, An+1 are rotatably jointed with one another at front and back ends thereof through joint sections B1, B2, B3, B4, B5, . . . , Bn−1, Bn, respectively. An inspection TV camera 66 or the like is attached to the foremost end of said arm An+1. When arm rotation angles around the axes $X_1$-$X_2$ and $Y_1$-$Y_2$ are set appropriately at each of joint sections, the TV camera 66 can be moved to any position and directed in any direction in a space in which the joint device is arranged. Therefore, the backside of an object hidden from the sight of the operator located on the side of said base 9 can be checked by the TV camera 66.

The position of said TV camera 66 in the space can be expressed as functions of the length of each arm and the arm rotation angles at each joint which can be formulated by the following equation (1):

$$\left.\begin{array}{l} Px = fx(\Phi h1, \Phi v1, \Phi h2, \Phi v2, \ldots, \Phi hn, \Phi vn, \\ \quad l1, l2, \ldots, ln, ln+1) \\ Py = fy(\Phi h1, \Phi v1, \Phi h2, \Phi v2, \ldots, \Phi hn, \Phi vn, \\ \quad l1, l2, \ldots, ln, ln+1) \\ Pz = fz(\Phi h1, \Phi v1, \Phi h2, \Phi v2, \ldots, \Phi hn, \Phi vn, \\ \quad l1, l2, \ldots, ln, ln+1) \end{array}\right\} \quad (1)$$

where Px: X position of Tv camera 66 in coordinates (x, y, z), Py: Y position of TV camera 66 in coordinates (x, y, z), Pz: Z position of TV camera 66 in coordinates (x, y, z), $\Phi h1, \Phi h2, \ldots, \Phi hn$: relative horizontal rotating angles of each set of arms A1 and A2, A2 and A3, . . . , An and An+1 at each of joint sections B1, B2, . . . , Bn, $\Phi v1, \Phi v2, \ldots, \Phi vn$: relative vertical rotating angles of each set of arms A1 and A2, A2 and A3, . . . , An and An+1, and l1, l2, . . . , ln, ln+1: lengths of arms A1, A2, . . . , An, An+1.

The position of each of joint sections B1, B2, . . . , Bn can be obtained by an equation similar to equation (1). The position of said joint B3, for example, can be expressed by the following equation (2):

$$\left.\begin{array}{l} Px3 = fx3(\Phi h1, \Phi v1, \Phi h2, \Phi v2, l1, l2, l3) \\ Py3 = fy3(\Phi h1, \Phi v1, \Phi h2, \Phi v2, l1, l2, l3) \\ Pz3 = fz3(\Phi h1, \Phi v1, \Phi h2, \Phi v2, l1, l2, l3) \end{array}\right\} \quad (2)$$

wherein Px3, Py3, Pz3 represent x, y, z positions of the joint B3 in coordinates (x, y, z) respectively.

A computor is usually employed to calculate spatial positions of TV camera 66 and joint sections B1, B2, . . . , Bn. FIG. 6 is a block diagram showing a controller for calculating these spatial positions and driving motors to control the position of said TV camera 66. A CPU 69 is connected via an interface 67 to motors M1, M2, M3, . . . , Mn−1, Mn arranged to arms. Output signals of potentiometers P1, P2, P3, . . . , Pn−1, Pn and limit switches LS1, LS2, LS3, . . . , LSn−1, LSn are applied to the CPU 69 through the interface 68. A memory 70 is connected to the CPU 69. Using rotating angles of arms, $\Phi h1, \Phi v1, \ldots, \Phi hn, \Phi vn$ detected by potentiometers P1, P2, . . . , Pn and also arm lengths l1, l2, . . . , ln+1 stored in the memory 70, the CPU 69 calculates the position of TV camera 66 according to equation (1). If each of arm lengths l1, l2, . . . , ln+1 is equal (l), the number of variables will be reduced to make the calculation of the CPU 69 simple. The spatial positions of said TV camera 66 and joint sections B1, B2, . . . , Bn calculated by the CPU 69 is stored in the memory 70. When the CPU 69 inputs the signals indicating the movement of the TV camera 66 to a new position, it calculates arm rotation angles at joint sections using the present position of said TV camera 66 applied from the memory 70 and according to equation (1), said arm rotation angles being needed to move the TV camera 66 to the desired position and at a desired attitude. The CPU 69 applies driving signals to motors M1, M2, . . . , Mn through the interface 67 to rotate arms only by desired angles. Position and image-taking direction of said TV camera 66 can be controlled as described above. When any of limit switches LS1, LS2, . . . , LSn detects that the relative angle between arms has reached its limit value, detection signal is applied to the CPU 69 through the interface 68. Then, the CPU 69 stopps the rotation of the motors.

Figure 7:
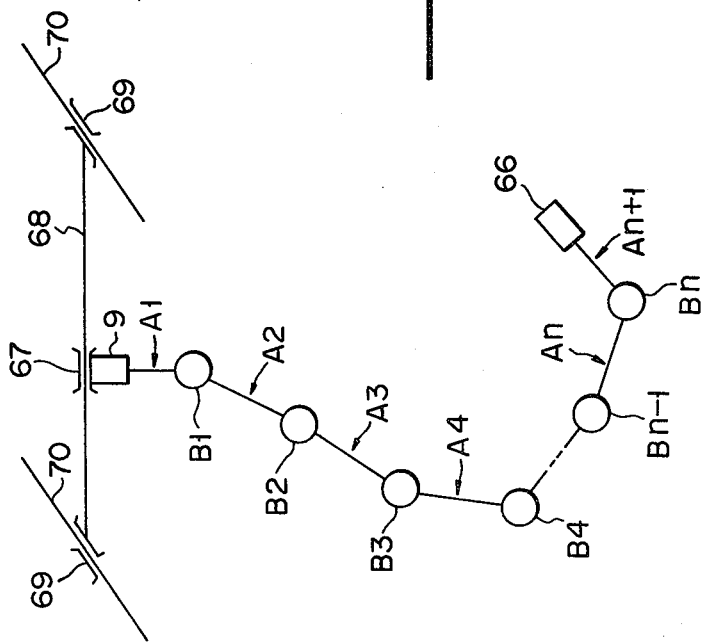
FIG. 7 is a schematic diagram showing another embodiment of checking means.

FIG. 7 shows another example of checking means in which the joint device of a multi-joint arm type is employed. The base 9 is mounted on a support wheel unit 67 arranged movable on a rail 68. The rail 68 itself is bridged between a pair of support wheel units 69 movable arranged on a pair of rails 70. The whole of said joint device including arms A1, A2, . . . , An+1 and joint sections B1, B2, . . . , Bn can be moved to a desired position by moving the support wheel units 67 and 69. Since it is moved by arm movements at each of joint sections as well as by movement of said support wheel units 67 and 69, the TV camera 66 has a wide range of spatial movement.

Figure 8:
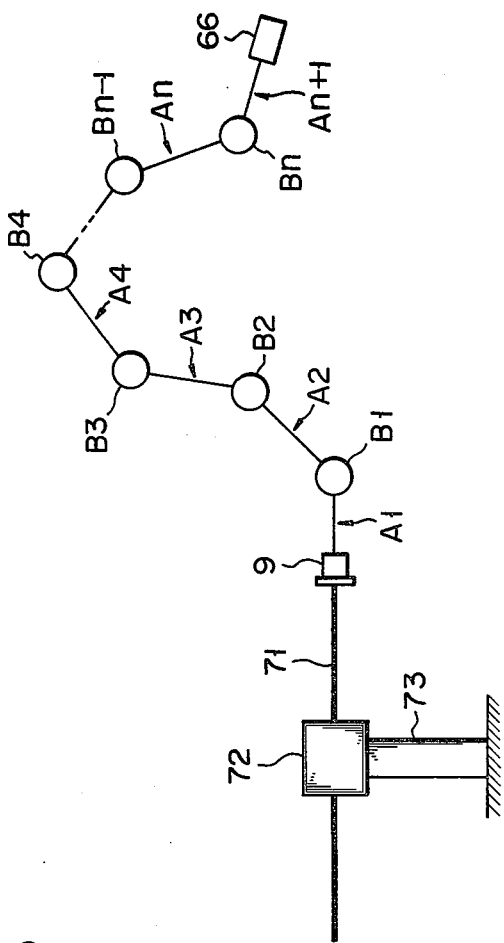
FIG. 8 is a schematic diagram showing a further embodiment of checking means.

FIG. 8 shows a further example of checking means. A cylinder 72 is mounted on a support stand 73 with its cylinder shaft 71 directed horizontally. The base 9 is attached to the foremost end of said cylinder shaft 71, keeping the longitudinal axis of arm A1 horizontal. Therefore, the whole of said joint device including arms A1, A2, . . . , and joint sections B1, B2, . . . , can be moved forward and backward when the cylinder shaft 71 of said cylinder 72 is reciprocated. This example is useful for inserting the joint device of a multi-joint arm type through a narrow entrance.

In these embodiments (shown in FIG. 5, FIG. 7 and FIG. 8), said TV camera 66 may be attached to the arm An+1 rotatable around the axis of the arm An+1. So, the transverse line of the picture taken by TV camera 66 coincides with the horizontal direction, said TV camera 66 is rotated relative to the arm An+1 by the angle calculated using the rotating angles $\Phi h1, \Phi v1, \ldots, \Phi hn, \Phi vn$ at joint sections B1, B2, . . . , Bn respectively.

Figure 9:
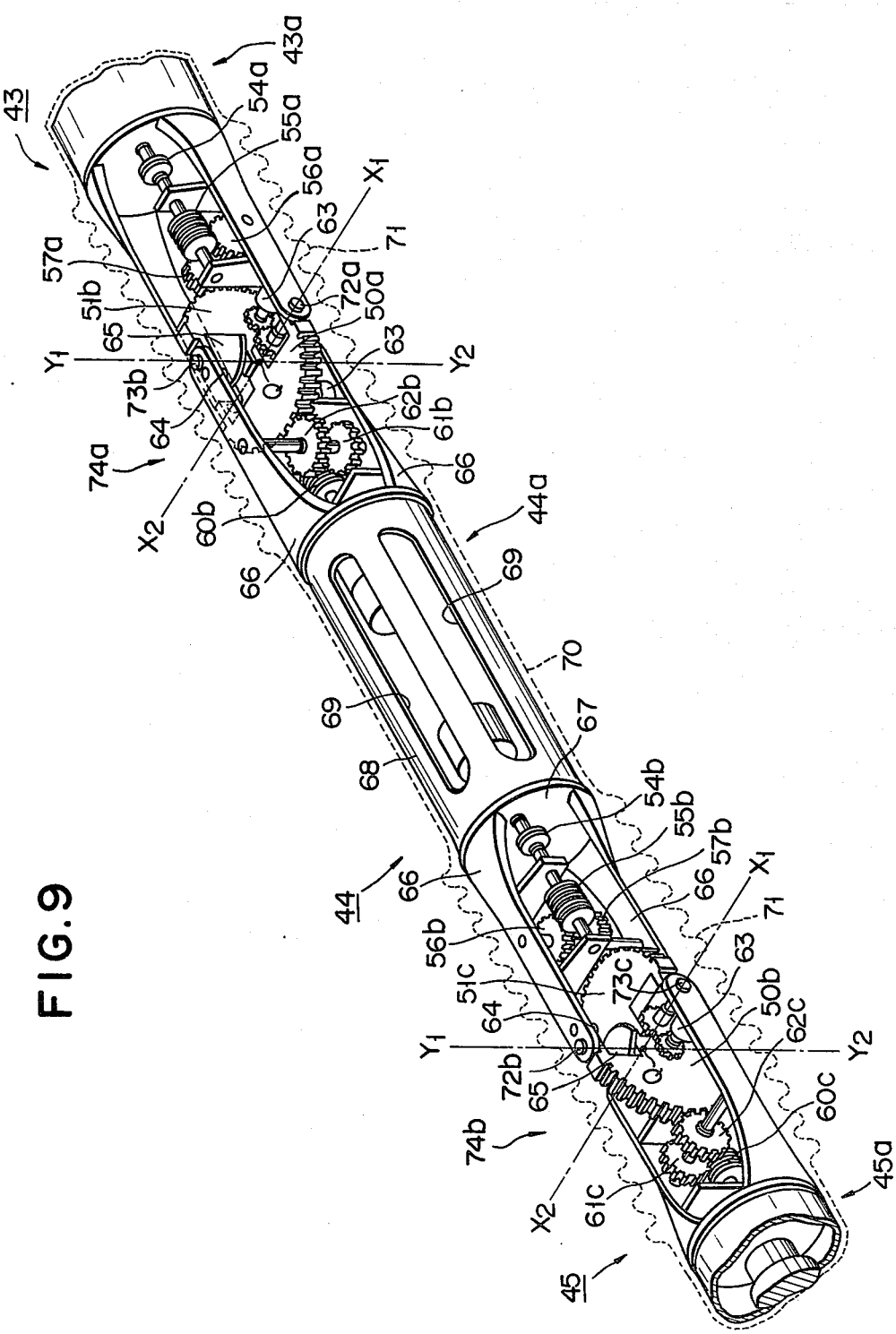
FIG. 9 is a perspective view showing another embodiment of a joint device of a multi-joint arm type according to the present invention.

Another embodiment of the joint device of a multijoint arm type will be described referring to FIG. 9. Each of the support members 43a, 44a, 45a in this embodiment include a tubular support unit 68, a pair of support discs 67 and two pairs of elongated support plates 66. The support discs 67 are fixed to the ends of the tubular support unit 68 in the longitudinal direction. A pair of the elongated support plates 66 are fixed to the support discs 67 respectively and arranged substantially parallel to each other. The elongated support plates 66 and support disc 67 may be made integral to one another, thus allowing the rigidity of the support members to be enhance and the assembly of the support members to be easy. The peripheral wall of the tubular support unit 68 has a plurality of apertures 69 to minimize the weight of the tubular support unit 68. The joint device of this embodiment is enveloped by a tubular cover unit 70 which is composed of flexible material. The tubular cover unit 70 has a portion 71 whose form is like a bellows in the vicinity of each of the joint sections. The support members 43a, 44a, 45a in this embodiment allow the rigidity of the arms 43, 44, 45 to be enhanced.

What is claimed is:

1. A joint device comprising:
   a first elongated support member;
   a first rotating means attached to one end of said first support member in a longitudinal direction thereof;
   a first plate-shaped guide member rotatably attached to one end of said first support member by said first rotating means, taking as its rotation axis a direction normal to a longitudinal direction of said first support member and parallel to a face of said first guide member;
   a second elongated support member;
   a second rotating means attached to one end of said second support member in a longitudinal direction thereof;
   a second plate-shaped guide member rotatably attached to one end of said second support member by said second rotating means, taking as its rotation axis a direction normal to a longitudinal direction of said second support member and parallel to a face of said second guide member, and also fixed to the first guide member with its rotation axis directed substantially perpendicular to a direction of rotation axis of said first guide member;
   a first driving means arranged on the second support member to drive the first guide member around the rotation axis of said second guide member; and
   a second driving means arranged on the first support member to drive the second guide member around the rotation axis of said first guide member.

2. A joint device comprising:
   a first elongated support member;
   a first rotating means attached to a front end of said first support member in the longitudinal direction thereof;
   a first plate-shaped front guide member rotatably attached to the front end of said first support member by said first rotating means, taking as its rotation axis a direction normal to the longitudinal direction of said first support member and parallel to the face of said first front guide member;
   a second elongated support member;
   a second rotating means attached to front and back ends of said second support member in the longitudinal direction thereof;
   a second plate-shaped back guide member rotatably attached to the back end of said second support member by said second rotating means, taking as its rotation axis a direction normal to the longitudinal direction of said second support member and parallel to the face of said second back guide member, and also fixed to the first front guide member with its rotation axis directed substantially perpendicular to the direction of rotation axis of said first front guide member;
   a second plate-shaped front guide member rotatably attached to the front end of said second support member by said second rotating means, taking as its rotation axis a direction normal to the longitudinal direction of said second support member and parallel to the face of said second front guide member;
   a third elongated support member;
   a third rotating means attached to the back ends of said third support member in the longitudinal direction thereof;
   a third plate-shaped back guide member rotatably attached to the back end of said third support member by said third rotating means, taking as its rotation axis a direction normal to the longitudinal direction of said third support member and parallel to the face of said third back guide member, and also fixed to the second front guide member with its rotation axis directed substantially perpendicular to the direction of rotation axis of said second front guide member;
   a second back driving means arranged on the first support member to drive the second back guide member around the rotation axis of said first front guide member;
   a second front driving means arranged on the third support member to drive the second front guide member around the rotation axis of said third back guide member;
   a first front driving means arranged on the second support member to drive the first front guide member around the rotation axis of said second back guide member; and
   a third back driving means arranged on the second support member to drive the third back guide member around the rotation axis of said second front guide member.

3. A joint device having a plurality of support members provided with joint sections at their front and back ends and connected with one another at their front and back joint sections; wherein each of said joint sections has a rotating means attached to the support member, and a plate-shaped guide member rotatably attached to the support member by said rotating means, taking as its rotation axis a direction normal to the longitudinal direction of said support member and parallel to the face of said guide member, the adjacent support members are connected to each other with their guide members fixed keeping their rotation axes directed substantially perpendicular to each other, and a driving means for driving one of these guide members around the rotation axis of the other is arranged on the support members adjacent to those to which said driven guide member is attached.

4. A joint device according to any one of claims 1 to 3 wherein said driving means includes a motor, a worm driven by the motor, and a worm wheel engaged with said worm to transmit the rotation of said motor to said guide member through said worm and worm wheel.

5. A joint device according to claim 4 wherein said driving means further includes a shaft having said worm wheel coaxially fixed thereto and being rotatably arranged on said support member, a wire drum coaxially fixed to this shaft, and a wire partially wound around the wire drum with its both ends fixed to both portions of the guide member apart in the circumferential direction thereof, said guide member being driven in the circumferential direction by said driving means.

6. A joint device according to claim 4 wherein said guide member is a semi-circular spur wheel having teeth formed on its circumferential end face, and said driving means further includes a shaft having the worm wheel coaxially attached thereto and being rotatably arranged on the support member, and a spur wheel coaxially fixed to the shaft and engaged with the guide member.

7. A joint device according to any one of claims 1 to 3 wherein said joint device has potentiometers arranged on said support members, pins rotatably attached to the support members and fixed to the guide members serve as rotating means, and a spur wheel coaxially fixed to said pins is engaged with a spur wheel coaxially fixed to the shaft of said potentiometers.

8. A joint device according to any one of claims 1 to 3 wherein said joint device further includes a detecting means for detecting maximum rocking angle, each of which comprises a detecting section arranged to one of said support member and guide member and an indication section arranged to the other of them.

9. A joint device according to claim 2 or 3 wherein said driving means respectively have two motors each to drive said guide member arranged at each of support members, said motors being juxtaposed with each other in a direction vertical to the longitudinal direction of said support members.

10. A joint device according to any one of claims 1 to 3 wherein said support member has two elongated support plates extending in the longitudinal direction and support discs for fixing said elongated support plates parallel to each other, and said guide member is rotatably attached to said elongated support plates.

11. A joint device according to claim 10 wherein said elongated support plates are made integral to said support discs.

12. A joint device according to claim 2 or 3 wherein said support members have a same length.

* * * * *